(12) United States Patent
Dasher et al.

(10) Patent No.: US 10,728,484 B2
(45) Date of Patent: *Jul. 28, 2020

(54) CONTROLLING DELIVERY OF VIDEO PROGRAMS USING USER DEFINED IDENTIFIERS FOR VIDEO RECEIVER DEVICES

(71) Applicant: ERICSSON AB, Stockholm (SE)

(72) Inventors: Charles Hammett Dasher, Lawrenceville, GA (US); Chris Phillips, Hartwell, GA (US)

(73) Assignee: ERICSSON AB, Stockholm (SE)

(*) Notice: Subject to any disclaimer, the term of this patent is extended or adjusted under 35 U.S.C. 154(b) by 362 days.

This patent is subject to a terminal disclaimer.

(21) Appl. No.: 14/050,034

(22) Filed: Oct. 9, 2013

(65) Prior Publication Data

US 2014/0040952 A1 Feb. 6, 2014

Related U.S. Application Data

(63) Continuation of application No. 13/083,725, filed on Apr. 11, 2011, now Pat. No. 8,584,177.

(51) Int. Cl.
| | |
|---|---|
| *H04N 7/173* | (2011.01) |
| *H04N 5/44* | (2011.01) |
| *H04N 21/475* | (2011.01) |
| *H04N 21/41* | (2011.01) |
| *H04N 21/422* | (2011.01) |
| *H04N 21/258* | (2011.01) |

(52) U.S. Cl.
CPC ..... *H04N 5/4403* (2013.01); *H04N 21/25816* (2013.01); *H04N 21/25875* (2013.01); *H04N 21/4126* (2013.01); *H04N 21/4222* (2013.01); *H04N 21/4751* (2013.01); *H04N 21/4753* (2013.01)

(58) Field of Classification Search
None
See application file for complete search history.

(56) References Cited

U.S. PATENT DOCUMENTS

| | | |
|---|---|---|
| 5,027,400 A | 6/1991 | Baji et al. |
| 6,654,721 B2 | 11/2003 | Handelman |
| (Continued) | | |

FOREIGN PATENT DOCUMENTS

| | | |
|---|---|---|
| CN | 1416646 A | 5/2003 |
| CN | 1595961 A | 3/2005 |
| CN | 101415105 A | 4/2009 |

*Primary Examiner* — Nnenna N Ekpo

(57) ABSTRACT

A method of controlling delivery of video programs from video distribution equipment to video receiver devices includes receiving messages at the video distribution equipment from a mobile terminal operated by a user. The messages contain user defined identifiers that are associated with equipment identifiers of different ones of the video receiver devices. The user defined identifiers are stored associated with the equipment identifiers in a subscriber account. Delivery of video programs from the video distribution equipment to the video receiver devices is controlled in response to commands received from the mobile terminal which request delivery of identified video programs to identified ones of the user defined identifiers. Related video distribution equipment and mobile terminals are disclosed.

16 Claims, 14 Drawing Sheets

(56) References Cited

U.S. PATENT DOCUMENTS

| | | |
|---|---|---|
| 7,161,483 B2 * | 1/2007 | Chung ............... H04L 12/2803 |
| | | 340/12.53 |
| 7,209,903 B1 * | 4/2007 | Mamdani ............. G06K 7/1095 |
| | | 235/375 |
| 7,305,691 B2 | 12/2007 | Cristofalo |
| 7,562,380 B2 | 7/2009 | Negishi et al. |
| 7,710,455 B2 | 5/2010 | Aramaki et al. |
| 7,730,505 B2 | 6/2010 | Fukumiya et al. |
| 7,746,223 B2 | 6/2010 | Howarter et al. |
| 7,770,783 B2 | 8/2010 | Grant et al. |
| RE43,648 E | 9/2012 | Lee et al. |
| 8,375,208 B2 * | 2/2013 | Darapu ........... H04N 21/25816 |
| | | 709/250 |
| 9,136,957 B1 * | 9/2015 | Napolitano ............ H04H 20/38 |
| 2002/0150387 A1 | 2/2002 | Kunii et al. |
| 2003/0108227 A1 * | 6/2003 | Philomin .......... G06K 9/00006 |
| | | 382/124 |
| 2003/0110512 A1 | 6/2003 | Maari |
| 2005/0028208 A1 * | 2/2005 | Ellis .................... H04N 7/163 |
| | | 725/58 |
| 2005/0055713 A1 * | 3/2005 | Lee .................... H04N 7/163 |
| | | 725/46 |
| 2005/0223410 A1 * | 10/2005 | Li ...................... G06F 9/4887 |
| | | 725/135 |
| 2005/0235329 A1 * | 10/2005 | Karaoguz .......... H04L 12/2803 |
| | | 725/81 |
| 2006/0041903 A1 * | 2/2006 | Kahn .............. H04N 21/43853 |
| | | 725/28 |
| 2008/0084867 A1 | 4/2008 | Foti et al. |
| 2008/0155619 A1 | 6/2008 | Constantinof |
| 2008/0163330 A1 * | 7/2008 | Sparrell ............... H04M 11/007 |
| | | 725/142 |
| 2009/0113481 A1 | 4/2009 | Friedman |
| 2009/0133090 A1 | 5/2009 | Busse |
| 2009/0172780 A1 | 7/2009 | Sukeda et al. |
| 2009/0187933 A1 | 7/2009 | Ritter et al. |
| 2009/0271837 A1 * | 10/2009 | Kim .................. H04N 7/17318 |
| | | 725/110 |
| 2009/0282001 A1 | 11/2009 | Fukuda |
| 2010/0017816 A1 * | 1/2010 | Martini ................. H04N 7/173 |
| | | 725/31 |
| 2010/0023965 A1 * | 1/2010 | Malik ............... H04N 21/4126 |
| | | 725/32 |
| 2010/0083335 A1 * | 4/2010 | Talbert ........... H04N 21/44209 |
| | | 725/131 |
| 2010/0161822 A1 | 6/2010 | Palm et al. |
| 2010/0162294 A1 * | 6/2010 | Yin .................... H04L 63/0823 |
| | | 725/30 |
| 2011/0023073 A1 * | 1/2011 | McCarthy ........... G06Q 20/123 |
| | | 725/98 |
| 2011/0055889 A1 | 3/2011 | Neill |
| 2012/0151525 A1 * | 6/2012 | Demchenko ......... H04N 21/482 |
| | | 725/39 |
| 2012/0198572 A1 * | 8/2012 | Beals .................... G06F 21/42 |
| | | 726/34 |
| 2014/0367464 A1 * | 12/2014 | Herzig ................. G06K 1/121 |
| | | 235/375 |

* cited by examiner

CONTROLLING DELIVERY OF VIDEO PROGRAMS USING USER DEFINED IDENTIFIERS FOR VIDEO RECEIVER DEVICES

CROSS-REFERENCE TO RELATED APPLICATIONS

This application is a continuation of U.S. application Ser. No. 13/083,725 filed Apr. 11, 2011, now U.S. Pat. No. 8,584,177, the disclosure of which is incorporated herein by reference.

FIELD

The present invention relates to video distribution, and more particularly to video distribution equipment and methods for controlling the delivery of video programming to set-top boxes.

BACKGROUND

Consumers can now access to a large number of television programs over an increasing number of television channels. Set-top boxes such as cable television receivers, satellite television receivers, and internet television receivers are becoming more popular because they provide certain advantages that were not previously available. Set-top boxes, for example, can allow users to digitally record programming content such as television programs, lock certain channels from being accessed without permission, view electronic program guide data, and/or set personal preferences that control how the program guide data and/or programming content is presented to the user.

It is becoming increasingly common for users to have set-top boxes in many different rooms of a house. Each of the set-top boxes can be independently controlled to play different programs. While some television networks allow only one-way communications from the back office to set-top boxes, it is becoming more common for television networks to allow bi-direction communications between the back office and set-top boxes. With two-way communication capabilities, a user may be able to operate one set-top box to control the functions of another set-top box via communications between the set-top boxes through the back office.

It is desirable to improve the user's ability to control all set-top boxes that are registered to the user, including enabling a user to operate a single remote control device anywhere in the user's house to control each of the set-top boxes and to do so irrespective of whether the television network allows one-way or bi-directional communications between the back office and the set-top boxes.

SUMMARY

Some embodiments are directed to a method of controlling delivery of video programs from video distribution equipment to video receiver devices, such as set-top boxes. Messages are received at the video distribution equipment from a mobile terminal operated by a user. The messages contain user defined identifiers that are associated with equipment identifiers of different ones of the video receiver devices. The user defined identifiers are stored associated with the equipment identifiers in a subscriber account. Delivery of video programs from the video distribution equipment to the video receiver devices is controlled in response to commands received from the mobile terminal which request delivery of identified video programs to identified ones of the user defined identifiers.

Accordingly, the user can define identifiers for each of the video receiver devices, and can then subsequently use those identifiers to control the delivery of video programs to the video receiver devices. As will be explained in further detail below, the user defined identifiers may include textual descriptions (e.g., "home theater") and/or graphical icons that represent different ones of the video receiver devices.

In some further embodiments, the mobile terminal may be used to scan an optical machine-readable representation (e.g. barcode) of the equipment identifiers of the video receiver devices. Alternatively, the video distribution equipment may communicate different images to different video receiver devices for display to a user, and may communicate all of the images to the mobile terminal. A user can sequentially move between the video receiver devices to view which of the images is being displayed through each of the video receiver devices, and can select corresponding images that are displayed on the mobile terminal and can assign identifiers to each of the selected video receiver devices.

Some other embodiments are directed to video distribution equipment that controls delivery of video programs to video receiver devices. The video distribution equipment is configured to receive messages from a mobile terminal containing user defined identifiers that are associated with equipment identifiers of different ones of the video receiver devices. The video distribution equipment is further configured to store the user defined identifiers associated with the equipment identifiers in a subscriber account, and to control delivery of video programs to the video receiver devices in response to commands received from the mobile terminal which request delivery of identified video programs to identified ones of the user defined identifiers.

Some other embodiments are directed to a mobile terminal that includes a user interface, a transceiver, and a microprocessor. The user interface is configured to receive user defined identifiers for video receiver devices from a user. The transceiver is configured to communicate with video distribution equipment. The microprocessor is configured to communicate, through the transceiver, commands containing the user defined identifiers for the video receiver devices to control delivery of video programs from the video distribution equipment to the video receiver devices.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings.

DETAILED DESCRIPTION

The invention will now be described more fully hereinafter with reference to the accompanying drawings, in which embodiments of the invention are shown. This invention may, however, be embodied in many different forms and is not to be construed as limited to the embodiments set forth herein.

Some embodiments are directed to controlling delivery of video programs from back-office video distribution equipment to a plurality of video receiver devices. Although various embodiments are described herein in the context of the video receiver devices being set-top boxes (STBs), the video receiver devices are not limited to set-top boxes and may be any type of electronic device that can receive a video program from video distribution equipment. Thus, for example, a video receiver device may include, but is not limited to, a cable television channel tuner, a satellite television channel tuner, a terrestrial broadcast television channel tuner, a video gaming device or console, a desktop computer, a laptop computer, a tablet computer, a palmtop computer, a cellular phone, and/or a mobile terminal.

Figure 1:
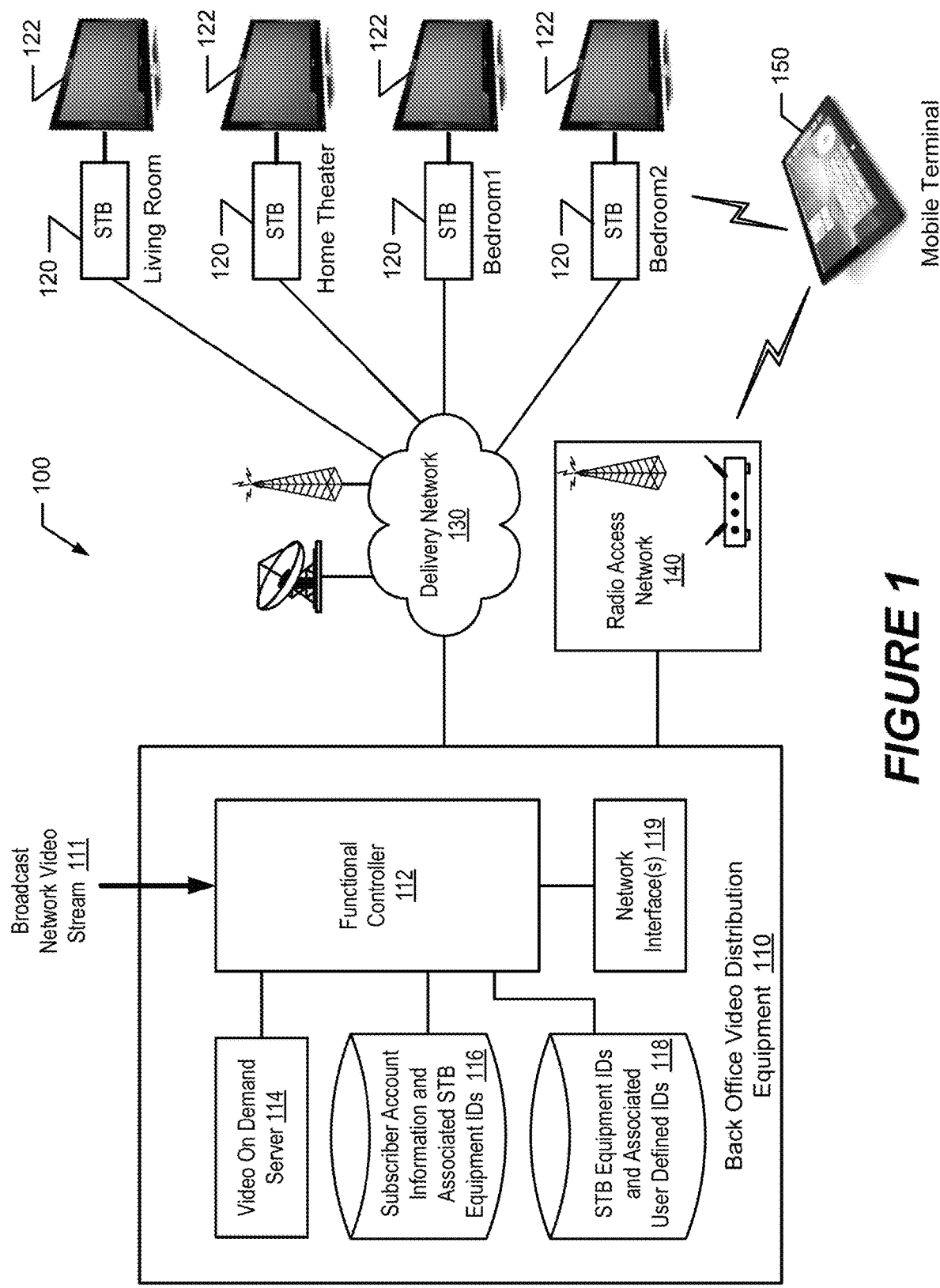
FIG. 1 is a block diagram that illustrates a system that controls delivery of video programs from video distribution equipment in a back office to video receiver devices according to some embodiments.

Example Video Distribution System:

FIG. 1 is a block diagram that illustrates an example video distribution system 100 that separately controls the delivery of video programs from video distribution equipment 110 in a back office to each of a plurality of set-top boxes (STBs) 120 according to some embodiments. Referring to FIG. 1, the video distribution equipment 110 can include a functional controller 112, a video on-demand server 114, a repository 116 (e.g., database) of subscriber account information and associated set-top box equipment identifiers (IDs), another repository 118 (e.g., database) of set-top box equipment identifiers and associated user defined identifiers for the set-top boxes 120, and a network interface 119. Although two repositories 116 and 118 have been shown in FIG. 1 for ease of illustration and explanation, they may be combined or the information therein may be distributed across more than two repositories.

The functional controller 112 is configured to control the flow of video programs, which are received in a broadcast network video stream 111 (e.g., cable/satellite/terrestrial/Internet television network broadcast video stream) and/or which are stored within a video on-demand server 114, through the network interface 119 to the set-top boxes 120. The video streams communicated to the set-top boxes 120 can be displayed on display devices 122 (e.g., LCD/plasma/cathode ray tube/other video display) that may be part of one or more of the set-top boxes 120 and/or may be connected to the one or more set-top boxes 120. The functional controller 112 may, for example, be configured to provide video on-demand services in response to commands received from the set-top boxes 120 and/or from a separate mobile terminal 150 operated by a user. The functional controller 112 may additionally or alternatively be configured to reroute/transfer a video flow that is presently directed to one of the set-top boxes 120 to instead being directed to another one of the set-top boxes 120.

Thus, for example, a user who is viewing a movie through a set-top box 120 in one room (e.g., living room) of a house may generate a command through the set-top box 120, another set-top box 120, and/or the mobile terminal 150 that causes the functional controller 112 of the video distribution equipment 110 to reroute the movie to another set-top box 120 that is in another room (e.g., home theater) of the house.

Each of the set-top boxes 120 has an assigned equipment identifier. The functional controller 112 can simultaneously provide different video programs for receipt by different ones of the set-top boxes 120 through use of their corresponding equipment identifiers.

The repository 116 stores subscriber account information that identifies equipment identifiers for each of the set-top boxes 120 that are registered with a subscriber. In the example of FIG. 1, four set-top boxes 120 are registered with a subscriber account. The equipment identifier of each of the set-top boxes 120 is stored in the repository 116 associated with the subscriber account.

In accordance with some embodiments, the user can define identifiers for each of the set-top boxes 120. The user defined identifiers are communicated to the functional controller 112 of the video distribution equipment 110, where there are stored in the repository 118 logically associated with the equipment identifiers for the set-top boxes 120. Accordingly, the repository 118 may include a list of equipment identifiers for each of the set-top boxes 120 that are registered with a subscriber account and may further include a corresponding list of user identifiers that have been defined by the user for each of the equipment identifiers of the set-top boxes 120. As described above, at least some of the information described herein as being stored in the repositories 116 and 118 may be combined into a single repository or distributed across more than two repositories.

For example, the user may define a "living room" textual identifier for one of the set-top boxes 120 in a living room of the user's house, define a "home theater" textual identifier for another one of the set-top boxes 120 in a home theater room, define a "bedroom 1" textual identifier for another one of the set-top boxes 120 in a master bedroom, and define a "bedroom 2" textual identifier for another one of the set-top boxes 120 in a child's bedroom. The user defined textual identifiers are communicated with another identifier that is known by the functional controller 112 and used to determine an association between the user defined textual identifiers and corresponding equipment identifiers for the set-top boxes 120. The functional controller 112 stores the determined associations between the user defined textual identifiers and the corresponding equipment identifiers in the repository 118 for subsequent use in controlling delivery of video programs to the set-top boxes 120. The user can then control the delivery of video programs to one of the set-top boxes 120 by selecting/entering the corresponding user defined textual identifier through the mobile terminal 150.

For example, the mobile terminal 150 may display a plurality of user defined identifiers for the set-top boxes 120. In the above home use example, the mobile terminal 150 may display a plurality of pictures/boxes with the corresponding textual labels "living room," "home theater," "bedroom 1," and "bedroom 2." The user may control delivery of a video program to one of the set-top boxes 120 by selecting the corresponding textual label ("living room," "home theater," "bedroom 1," or "bedroom 2"). The functional controller 112 responds to a command received from the mobile terminal 150 that identifies selected textual label by using the repository 118 to determine the associated equipment identifier for the set-top box 120, and controls the delivery of a video program to the determined equipment identifier. Thus, to transfer a movie (or other video program) that is presently playing through the set-top box 120 in the living room to the set-top box 120 in the home theater room, the user may initiate a transfer command on the mobile terminal, select the "living room" identifier to identify which movie being played is to be transferred, and then select the "home theater" identifier to identify the set-top box 120 in the home theater as where the identified movie is to be transferred for further playing. The order of the user's selection may occur in occur in another order without deviating from this embodiment.

The mobile terminal 150 can be configured, for example, as a wireless communication terminal that communicates with the video distribution equipment 110 through a radio access network 140 that is communicatively connected to the network interface 119. The RAN 140 may contain one or more cellular radio access technology systems that may include, but are not limited to, Global Standard for Mobile (GSM) communication, General Packet Radio Service (GPRS), enhanced data rates for GSM evolution (EDGE), DCS, PDC, PCS, code division multiple access (CDMA), wideband-CDMA, CDMA2000, Universal Mobile Telecommunications System (UMTS), and/or 3GPP LTE ($3^{rd}$ Generation Partnership Project Long Term Evolution). The RAN 140 may alternatively or additional communicate with the mobile terminal 150 through a Wireless Local Area Network (i.e., IEEE 802.11) interface, a Bluetooth interface, and/or other radio frequency (RF) interface. The mobile terminal 150 may be further configured to communicate with the set-top boxes 120 using RF and/or infrared (IR) communication signaling.

The video distribution equipment 110 may deliver video streams to the set-top boxes 120 and may be further configured to receive messages/commands (e.g., Internet protocol television (IPTV) messages/commands and/or other video-on-demand messages/commands) from one or more of the set-top boxes 120 through the network interface 119 and a delivery network 130. The delivery network 130 may be a private network, a public network, such as the Internet, or a combination of private and public network elements.

Example Operations and Methods for Identifying Set-Top Boxes and Associated User Defined Identifiers:

In some embodiments, the user can enter the equipment identifier for each of the set-top boxes 120 for which the user wants to define a user identifier. The user may use a camera on the mobile terminal 150 to scan an optical machine-readable representation of the equipment identifier (e.g. barcode) that may be printed on a sticker or otherwise displayed on the set-top boxes 120. Alternatively or additionally, the user may manually enter (e.g. type through a keyboard/keypad) the equipment identifier into the mobile terminal 150. The wireless terminal 150 can then communicate the entered equipment identifier and a corresponding user defined identifier for the set-top box 120 to the video distribution equipment 110 for storage in the repository 118, and for subsequent use in controlling delivery of video programs to the set-top box 120.

Figure 2:
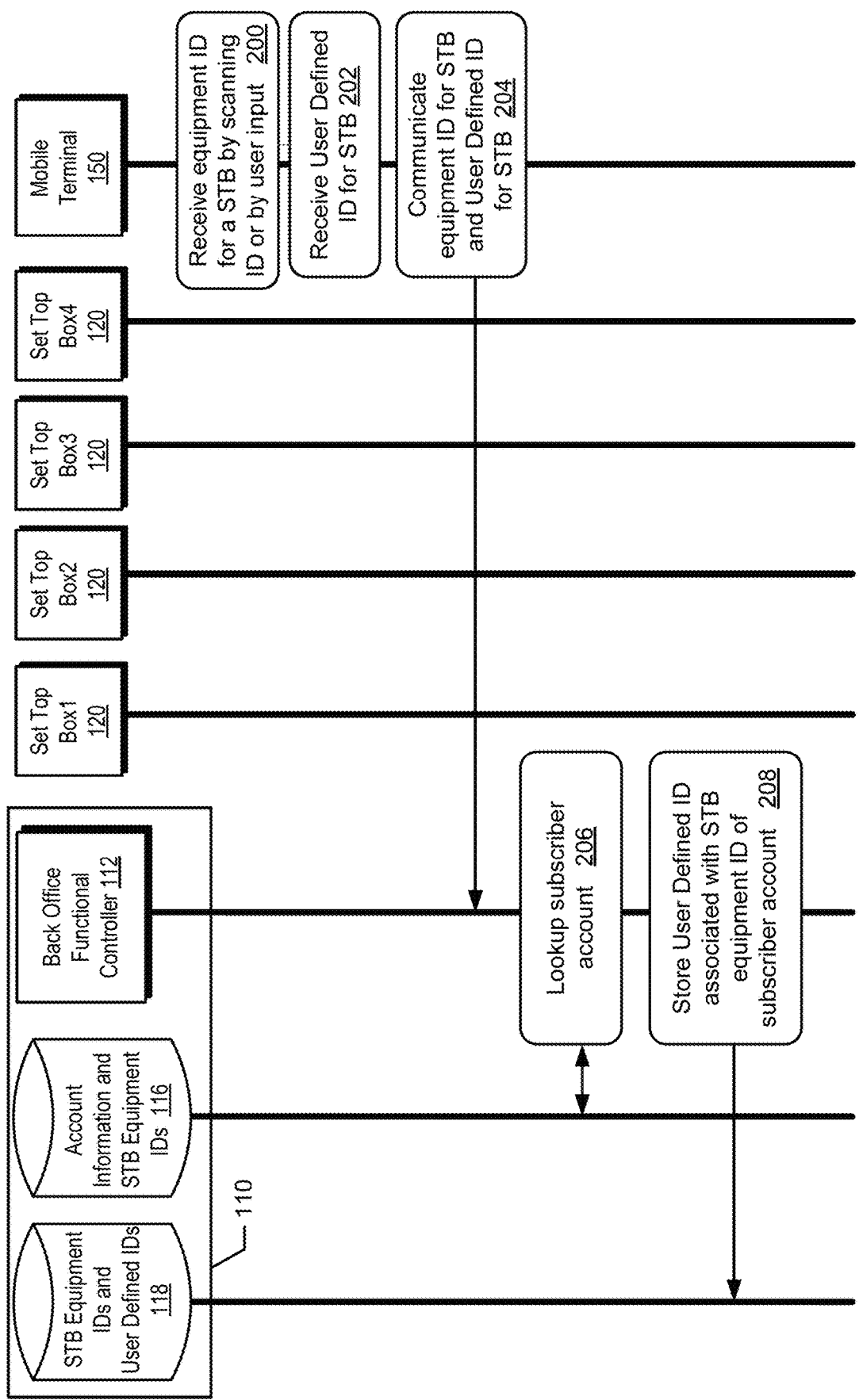
FIG. 2 is a data flow diagram that illustrates operations and methods performed by the video distribution equipment and the mobile terminal of FIG. 1 according to some embodiments.

These and other operations and methods are illustrated by the data flow diagram of FIG. 2, which can be performed by the video distribution equipment 110 and the mobile terminal 150 of FIG. 1.

Referring to FIG. 2, the mobile terminal 150 receives (block 200) an equipment identifier for a set-top box 120 by scanning the optical machine-readable representation of the equipment identifier and/or by a user manually entering the equipment identifier through a user interface. The mobile terminal 150 also receives (block 202) a user defined identifier for the set-top box 120. Mobile terminal 150 communicates (block 204) a message containing the equipment identifier and the user defined identifier for the set-top box 120 to the functional controller 112 of the video distribution equipment 110. The functional controller 112 responds to receipt of the message by accessing the repository 116 to look up (block 206) the subscriber account using the equipment ID contained in the message. The functional controller 112 then stores (block 208) the user defined identifier logically associated with the equipment identifier of the set-top box 120 in the repository 118.

The mobile terminal 150 and the functional controller 112 repeat the corresponding operations of blocks 200 through 208 as the user moves to different ones of the set-top boxes 120 (e.g., moving from room-to-room in the user's house) to define different identifiers for each of the set-top boxes 120, and to have those user defined identifiers stored in the repository 118 where they are logically associated with the equipment identifiers for those set-top boxes 120.

Other Operations and Methods for Identifying Set-Top Boxes and Associated User Defined Identifiers:

In some other embodiments, the video distribution equipment 110 communicates different images to each of the set-top boxes 120 to facilitate the user's identification of each of the set-top boxes 120 to the video distribution equipment 110. The video distribution equipment 110 may also communicate each of the images to the mobile terminal 150 where they are displayed on a display device. The user can then observe one of images that is being displayed through one of the set-top boxes 120 and select the corresponding image that is being displayed by the mobile terminal 150, and can enter a user defined identifier for that set-top box 120. The mobile terminal 150 can communicate a message to the video distribution equipment 110 that contains image selection data that identifies one of images displayed on the mobile terminal 150 that has been selected by the user as corresponding to one of images observed by the user through one of the set-top boxes 120 and further contain the user-defined identifier for that set-top box 120.

Alternatively or additionally, the mobile terminal 150 may take a picture of one of images that is being displayed through one of the set-top boxes 120. The mobile terminal 150 can communicate a message to the video distribution equipment 110 that contains the picture along with the user-defined identifier for that set-top box 120 through which the pictured image was displayed.

Figure 3A:
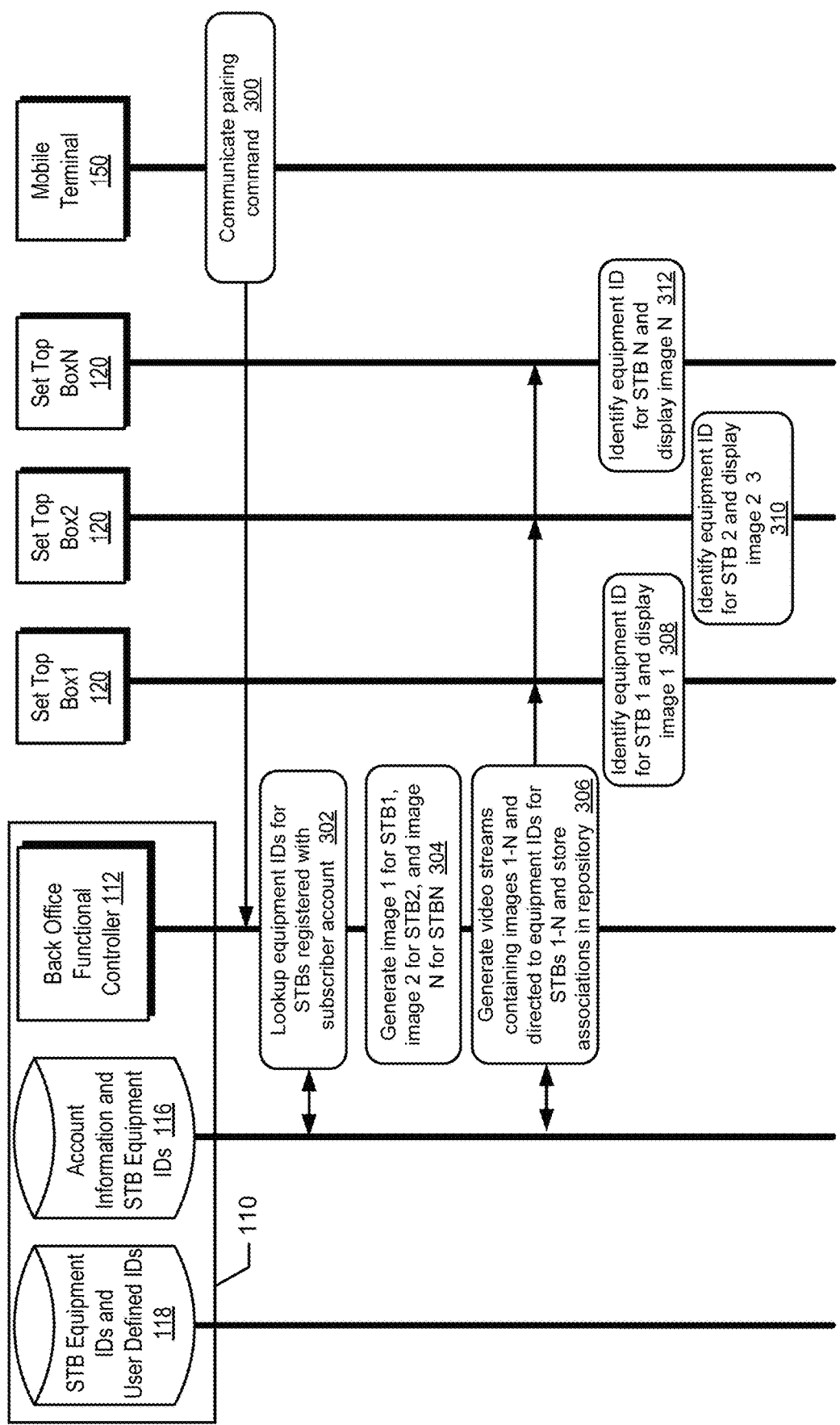
FIGS. 3a-c are data flow diagrams that illustrates operations and methods performed by the video distribution equipment, the video receiver devices, and the mobile terminal of FIG. 1 according to some embodiments.
Figure 3B:
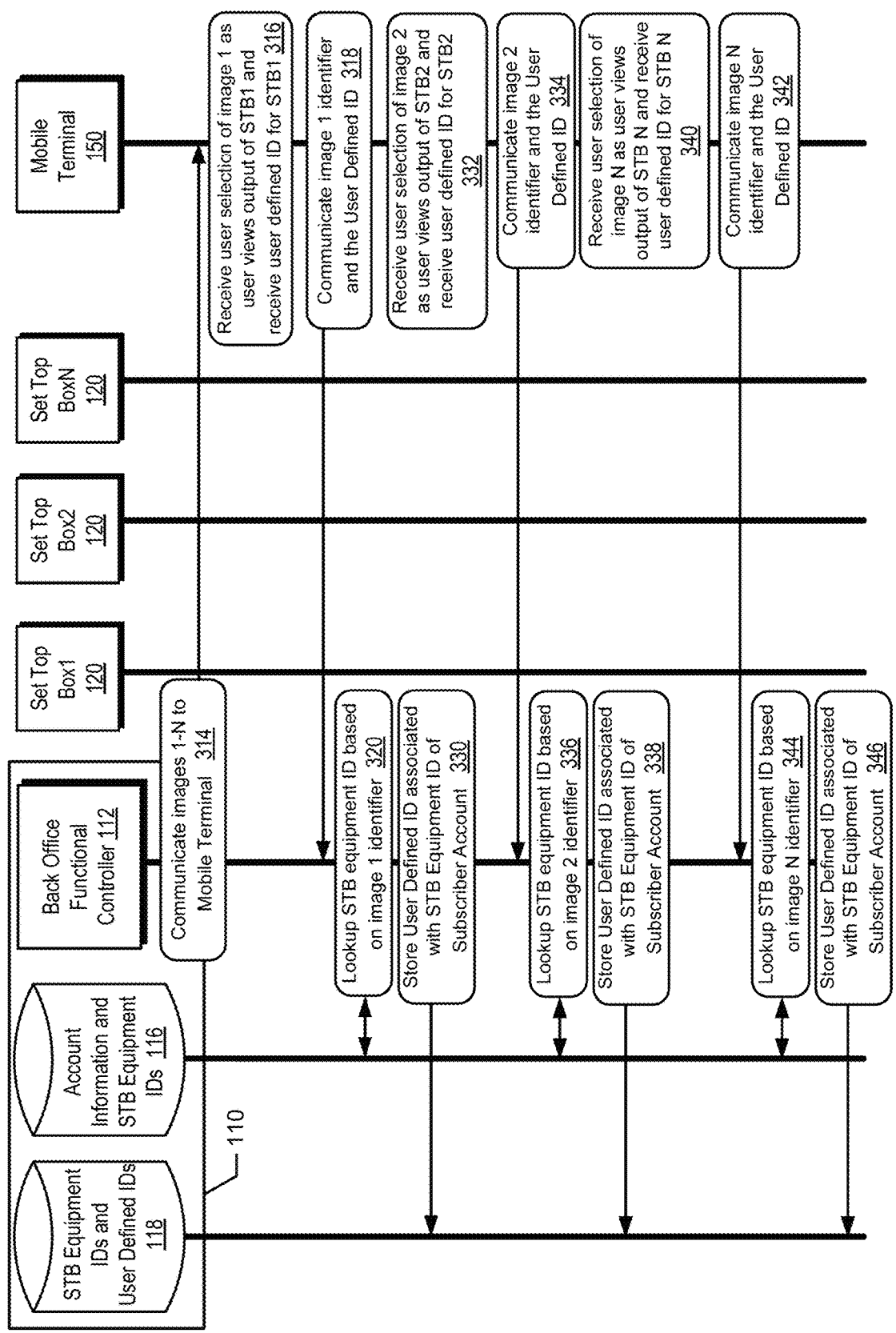
Figure 3C:
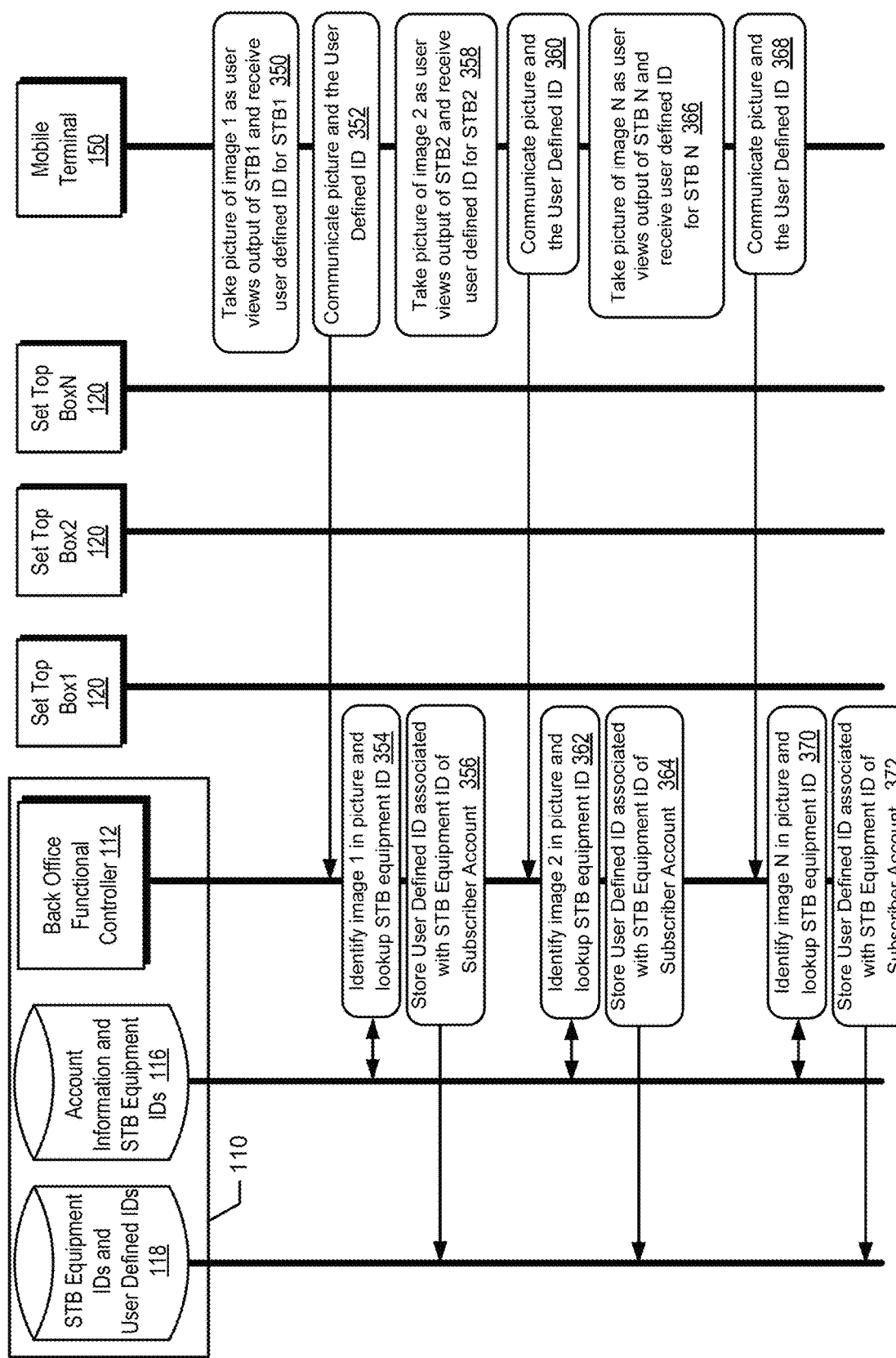

These and other operations are further illustrated by FIGS. 3a-c, which are data flow diagrams of operations and methods performed by the video distribution equipment 110, the video receiver devices 120, and the mobile terminal 150 of FIG. 1 according to some embodiments. Referring to FIGS. 3a-b, the user may operate the mobile terminal 150 to login to the subscriber account and communicate (block 300) a pairing command to the functional controller 112 of the video distribution equipment 110 to initiate pairing of one or more set-top boxes 120 to corresponding user defined identifiers for those set-top boxes 120. The pairing command may alternatively or additionally be communicated from one or more of the set-top boxes 120 to the functional controller 112 in response to, for example, a user pressing a button on the set-top box(es) 120 or a remote control device.

The functional controller 112 responds to the pairing command by accessing the repository 116 to identify (block 302) the set-top boxes 120 that are registered with the subscriber account. The functional controller 112 then generates (block 304) a first image "image 1" for use with a first one of the set-top boxes 120 ("STB1"), a second image "image 2" for use with a second one of the set-top boxes 120 ("STB2"), and generates further images including an Nth image ("image N") for use with an Nth one of the set-top boxes 120 ("STB N"), where N is an integer greater than one. Each of images may be different from one another, and may be retrieved from among a list of images that may reside in the repository 118.

The functional controller 112 may transcode (block 306) each of the images into a corresponding video stream to generate a plurality of video streams (e.g., N number of images can be transcoded to generate N video streams), and the video streams are communicated to the video receiver devices using a different carrier frequency. The functional controller 112 may also communicate force tune commands containing the equipment identifiers of the 1-Nth set-top boxes 120 to cause each of the 1-Nth set-top boxes 120 to tune to a different one of the carrier frequencies to receive one of the video streams containing one of the images associated with the respect equipment identifier for the set-top box 120.

The functional controller 112 may store (block 306) a listing of the images sent to each of the set-top boxes 120 and the corresponding equipment identifiers for those set-top boxes 120 in the repository 116 associated with the subscriber account.

For example, the functional controller 112 can communicate the first video stream containing the first image using a first carrier frequency and communicate a force tune command to the first set-top box 120 ("STB1"). The first set-top box 120 ("STB1") identifies (block 308) it's equipment identifier in the force tune command, and tunes to the first carrier frequency to display the first video stream containing the first image on the associated display device 122. Similarly, the functional controller 112 can communicate the second video stream containing the second image using a second carrier frequency and communicate a force tune command to the second set-top box 120 ("STB2"). The second set-top box 120 ("STB2") identifies (block 310) it's equipment identifier in the force tune command, and tunes to the second carrier frequency to display the second video stream containing the second image on the associated display device 122. In a similar manner, the functional controller 112 can communicate the Nth video stream containing the Nth image using a Nth carrier frequency and communicate a force tune command to the Nth set-top box 120 ("STB N"). The Nth set-top box 120 ("STB N") identifies (block 312) it's equipment identifier in the force tune command, and tunes to the Nth carrier frequency to display the Nth video stream containing the Nth image on the associated display device 122.

FIG. 3b illustrates operations and methods that correspond to the embodiment described above in which all of the images communicated to the 1-Nth set-top boxes 120 are also communicated to the mobile terminal 150 for display to the user. The user can then observe one of images that is being displayed through one of the set-top boxes 120 and select the corresponding image that is being displayed by the mobile terminal 150, and can enter a user defined identifier for that set-top box 120.

Referring to FIG. 3b, the functional controller 112 communicates (block 314) each of images 1 to N to the mobile terminal 150 for display on a display device. The user can then observe the first image ("image 1") that is being displayed through the first set-top box 120 and selects (block 316) the corresponding first image ("image 1") that is being displayed by the mobile terminal 150. The user can also enter (block 316) a user defined identifier (e.g., a textual description and/or graphical representations) for the first set-top box 120. The mobile terminal 150 can communicate (block 318) a message to the functional controller 112 that contains image selection data that identifies the first image ("image 1") displayed on the mobile terminal that has been selected by the user as corresponding to the first image ("image 1") observed by the user through the first set-top box 120 and can further contain the user-defined identifier for the first set-top box 120.

The functional controller 112 accesses the repository 116 using the image selection data including the identified first image ("image 1") to look up (block 320) the equipment identifier for the first set-top box 120. The functional controller 112 stores (block 330) the user-defined identifier from the message in the repository 118 logically associated with the equipment identifier for the first set-top box 120.

Similarly, the user can move to another room containing the second set-top box 120, observe the second image ("image 2") that is being displayed through the second set-top box 120 and selects (block 332) the corresponding second image ("image 2") that is being displayed by the mobile terminal 150. The user can also enter (block 332) a user defined identifier (e.g., a textual description and/or graphical identifier) for the second set-top box 120. The mobile terminal 150 can communicate (block 334) a message to the functional controller 112 that contains image selection data that identifies the second image ("image 2") displayed on the mobile terminal that has been selected by the user as corresponding to the second image ("image 2") observed by the user through the second set-top box 120 and can further contain the user-defined identifier for the second set-top box 120.

The functional controller 112 accesses the repository 116 using the image selection data including the identified second image ("image 2") to look up (block 336) the equipment identifier for the second set-top box 120. The functional controller 112 stores (block 338) the user-defined identifier from the message in the repository 118 logically associated with the equipment identifier for the second set-top box 120.

In a similar manner, the user move to yet another room containing the Nth set-top box 120, observe the Nth image ("image N") that is being displayed through the Nth set-top box 120 and selects (block 340) the corresponding second image ("image N") that is being displayed by the mobile terminal 150. The user can also enter (block 340) a user defined identifier (e.g., a textual description and/or graphical identifier) for the Nth set-top box 120. The mobile terminal 150 can communicate (block 342) a message to the functional controller 112 that contains image selection data that identifies the Nth image ("image N") displayed on the mobile terminal that has been selected by the user as corresponding to the Nth image ("image N") observed by the user through the Nth set-top box 120 and can further contain the user-defined identifier for the Nth set-top box 120.

The functional controller 112 accesses the repository 116 using the image selection data including the identified Nth image ("image N") to look up (block 344) the equipment identifier for the Nth set-top box 120. The functional controller 112 stores (block 346) the user-defined identifier from the message in the repository 118 logically associated with the equipment identifier for the Nth set-top box 120.

FIG. 3c illustrates operations and methods that correspond to the embodiment described above in which the mobile terminal 150 is used to take a picture of one of images that is being displayed through one of the set-top boxes 120. The mobile terminal 150 can communicate a message to the functional controller 112 that contains the picture along with the user-defined identifier for that set-top box 120 through which the pictured image was displayed. The operations and methods of FIG. 3c may be used as an alternative to or in addition to the operations and methods of FIG. 3b.

Referring to FIG. 3c, the user operates the mobile terminal 150 to take a picture (block 350) of the first image ("image 1") that is displayed through the first set-top box 120, and to receive a user defined identifier for the first set-top box 120. Mobile terminal 150 communicates (block 352) a message to the functional controller 112 containing the picture and the user-defined identifier. The functional controller 112 identifies (block 354) the first image ("image 1") in the picture, and accesses the repository 116 to look up (block 354) the equipment identifier for the first set-top box 120 using the identified first image ("image 1") and the associations stored in the repository 116 that identify which of the images were sent to which of the set-top boxes 120. The functional controller 112 stores (block 356) the user-defined identifier from the message in the repository 118 logically associated with the equipment identifier for the first set-top box 120.

The user further operates the mobile terminal 150 to take a picture (block 358) of the second image ("image 2") that is displayed through the second set-top box 120, and to receive a user defined identifier for the second set-top box 120. Mobile terminal 150 communicates (block 360) a message to the functional controller 112 containing the picture and the user-defined identifier. The functional controller 112 identifies (block 362) the second image ("image 2") in the picture, and accesses the repository 116 to look up (block 362) the equipment identifier for the second set-top box 120 using the identified second image ("image 2") and the associations stored in the repository 116 that identify which of the images were sent to which of the set-top boxes 120. The functional controller 112 stores (block 364) the user-defined identifier from the message in the repository 118 logically associated with the equipment identifier for the second set-top box 120.

In a similar manner, the user further operates the mobile terminal 150 to take a picture (block 366) of the Nth image ("image N") that is displayed through the Nth set-top box 120, and to receive a user defined identifier for the Nth set-top box 120. Mobile terminal 150 communicates (block 368) a message to the functional controller 112 containing the picture and the user-defined identifier. The functional controller 112 identifies (block 370) the Nth image ("image N") in the picture, and accesses the repository 116 to look up (block 370) the equipment identifier for the Nth set-top box 120 using the identified Nth image ("image N") and the associations stored in the repository 116 that identify which of the images were sent to which of the set-top boxes 120. The functional controller 112 stores (block 372) the user-defined identifier from the message in the repository 118 logically associated with the equipment identifier for the Nth set-top box 120.

Figure 4:
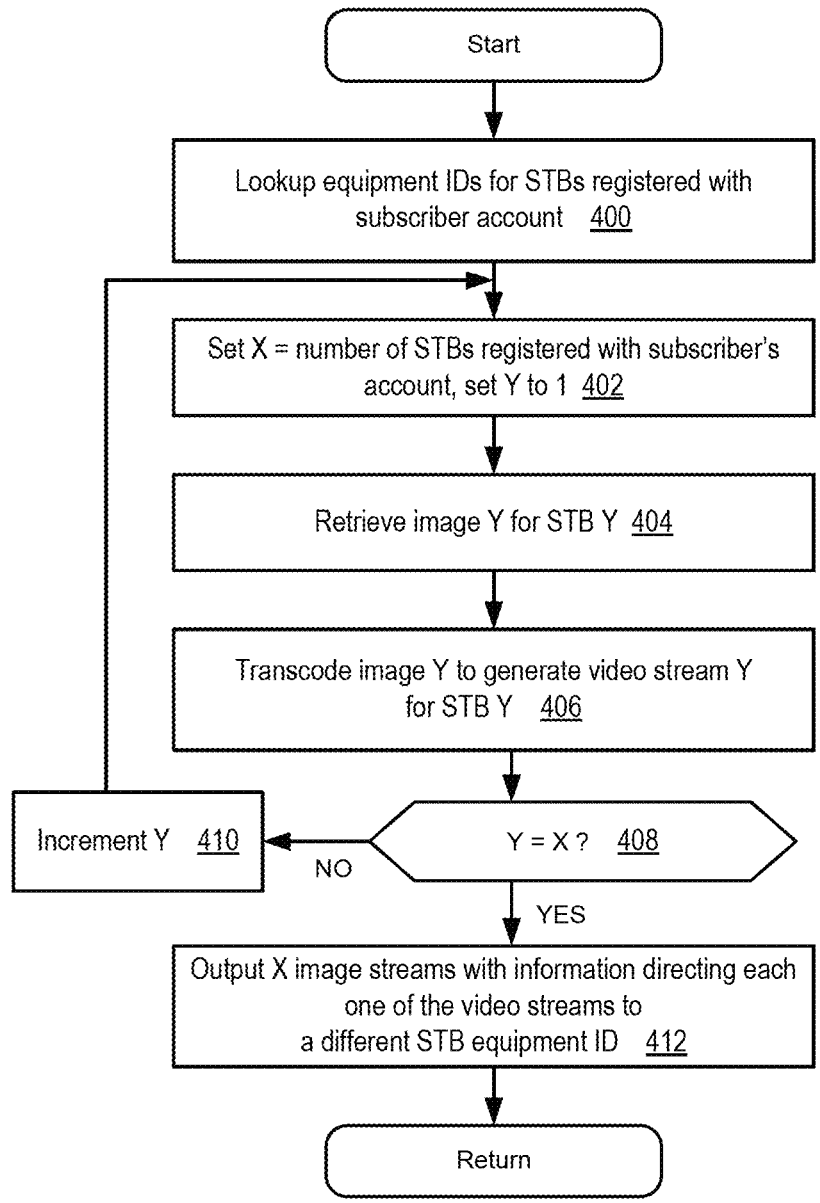
FIG. 4 is a flowchart that illustrates operations and methods performed by a functional controller of the video distribution equipment of FIG. 1 according to some embodiments.

The video distribution controller 110 may facilitate the user's definition of user defined identifiers for each of the set-top boxes 120 by identifying all set-top boxes 120 that are registered with the subscriber account and communicating a different image for display on each of those set-top boxes 120. These operations and methods may be performed by the functional controller 112 in boxes 302-306 of FIG. 3a, and are illustrated below in FIG. 4. Referring to FIG. 4, the functional controller 112 accesses the repository 116 to look-up (block 400) the equipment identifiers for all of the set-top boxes 120 that are registered with the subscriber account. A counter "X" is initialized (block 402) to the number of set-top boxes 120 that are registered with the subscriber account, and another counter "Y" is initialized to 1.

A unique image corresponding to counter Y is retrieved (block 404), such as from the repository 118, for communication to the set-top box corresponding to counter Y. The image is transcoded (block 406) to generate a video stream corresponding to counter Y. When a video stream has not yet been generated for all of the set-top boxes 120 (i.e., Y<X in block 408), the counter Y is incremented (block 410) and the operations of blocks 404-408 are repeated.

When a video stream has been generated for all of the set-top boxes 120 (i.e., Y=X), the video streams are output (block 412), each of the video streams includes a different one of the equipment identifiers for the set-top boxes 120 so that the set-top boxes 120 each receive and display the image contained in a different one of the video streams.

Example Operations and Methods for Controlling Delivery of Video Programs Using the User Defined Identifiers:

As explained above, once the user defined identifiers (e.g., textual descriptions and/or graphical representations) and the corresponding equipment identifiers for one of more of the set-top boxes 120 have been logically associated together and stored by the video distribution equipment 110, the user can then control delivery of video programs from the video distribution equipment 110 to selected ones of those set-top boxes 120 using the user defined identifiers.

Figure 5:
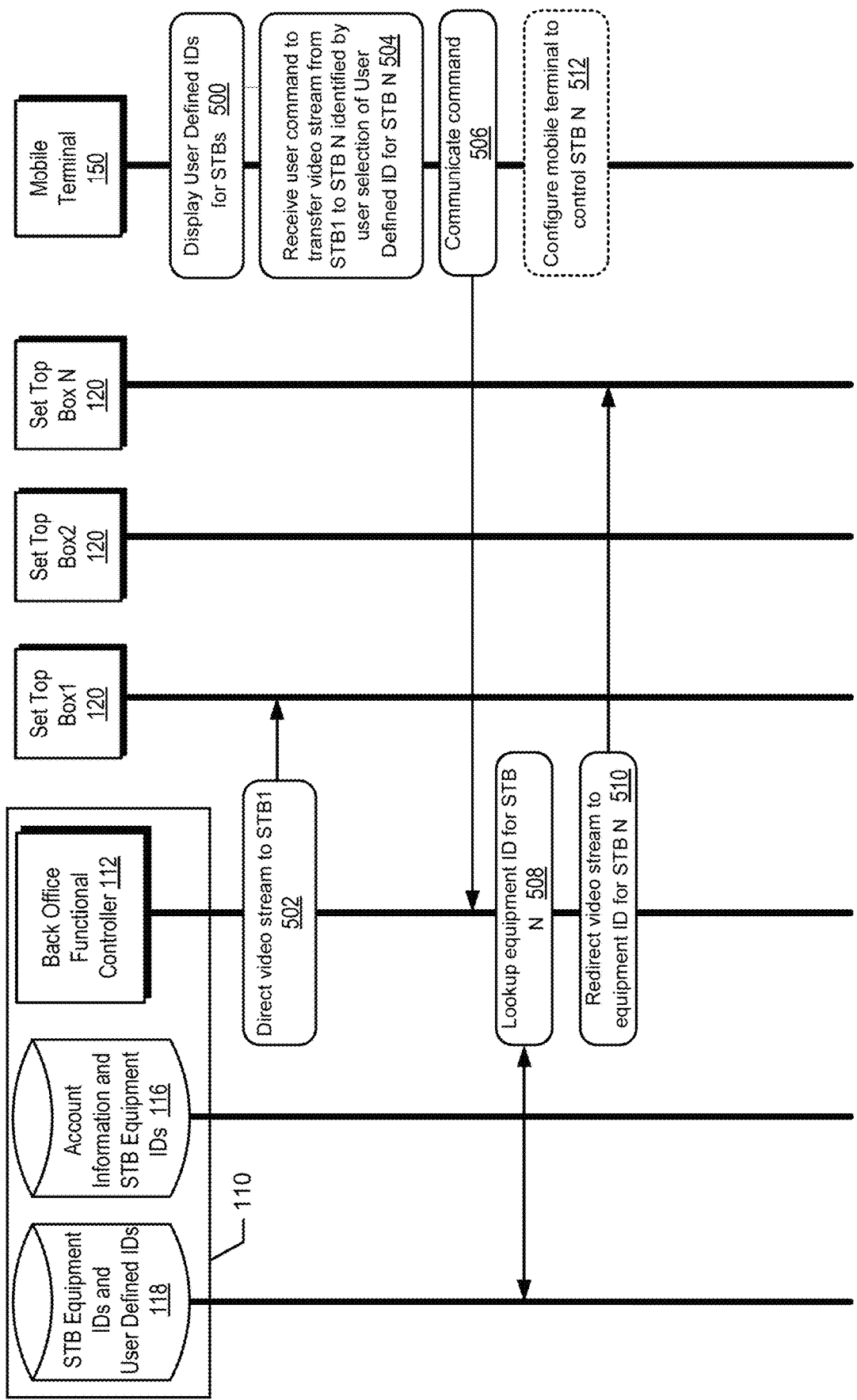
FIG. 5 is a data flow diagram that illustrates operations and methods performed by the video distribution equipment, the video receiver devices, and the mobile terminal of FIG. 1 according to some embodiments.

FIG. 5 is a data flow diagram that illustrates operations and methods that redirect the delivery of a video program from the video distribution equipment 100 to one of the set-top boxes 120 to instead be delivered to another one of the set-top boxes 120 through use of user defined identifiers for those set-top boxes.

Referring to FIG. 5, the mobile terminal 150 displays (block 500) on a display device the user defined identifiers for the set-top boxes 120. The user defined identifiers may be displayed as textual descriptions within or adjacent to graphical representations of the set-top boxes 120. For example, each of the set-top boxes 120 may be displayed as icons that represent a video tuner device (e.g., cable television tuner), and a label may be displayed adjacent to the icons to identify which of the set-top boxes 120 is in the "living room," the "home theater," the "bedroom1," and the "bedroom2."

The functional controller 502 directs a video stream to a first one of the set-top boxes 120 for display on the associated video display 122.

To transfer (redirect) the video stream from being played through a first one of the set-top boxes 120 to instead or additionally being played through an Nth one of the set-top boxes 120, the user operates the mobile terminal 150 to select (block 504) the corresponding displayed icons of the first and Nth boxes and select a command for transferring the video stream. When the display device of the mobile terminal 150 is a touch controlled display, the user may touch select the displayed icons for the first and Nth set-top boxes 120. The mobile terminal 150 communicates (block 506) to the functional controller 112 a command containing the user defined identifiers for the selected first and Nth set-top boxes 120 and an instruction to transfer the video stream.

The functional controller 112 uses the received user defined identifiers to look-up (block 508) the equipment identifiers for the corresponding first and Nth set-top boxes 120. The functional controller 112 redirects (block 510) the video stream to the equipment identifier for the Nth set-top box 120 and may cease directing the video stream to the equipment identifier for the first set-top box 120.

When the mobile terminal 150 is configured to control the Nth set-top box 120 (e.g., a universal remote type function that can send IR/RF commands to control the Nth set-top box 120), the functional controller 112 may also configure (block 512) the mobile terminal 150 to activate a control mode for controlling the Nth set-top box. The user may thereby start controlling the Nth set-top box 120 using the mobile terminal 150.

The user may similarly start delivery of a video stream, restart delivery of a video stream, partially rewind in time the delivery of a video stream, fast-forward in time the delivery of a video stream, jump-forward in time the delivery of a video stream, pause delivery of a video stream, and/or perform other operations to control the delivery of a video stream from the video distribution equipment 110 to a desired set-top box 120 by controlling the mobile terminal 150 to select a displayed icon that corresponds to the desired set-top box 120 and to define a corresponding action that is to be performed by the video distribution equipment 110. The user defined identifier corresponding to the displayed icon for the desired set-top box 120 and the corresponding action are communicated to the video distribution equipment 110.

Figure 6:
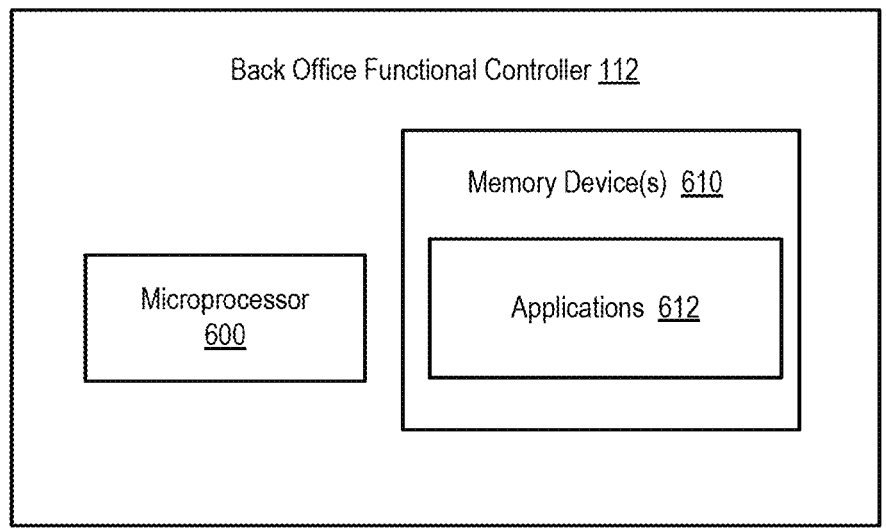
FIG. 6 is a block diagram that illustrates a functional controller of the video distribution equipment of FIG. 1 that is configured according to some embodiments.

Example Functional Controller Configuration for Video Distribution Equipment:

FIG. 6 is a block diagram that illustrates the functional controller 112 of the video distribution equipment 110 of FIG. 1 that is configured according to some embodiments. Referring to FIG. 6, the functional controller 112 may include a microprocessor 600 and memory device(s) 610. The memory device(s) 610 include mass storage devices, such as one or more disk drives and/or semiconductor memory, that contain instructions that are executable by the microprocessor 600, and may further include information forming at least part of the repositories 116 and 118. The microprocessor 600 may include one or more data processing circuits, such as a general purpose and/or special purpose processor with on-board and/or separate memory devices. The microprocessor 600 is configured to execute computer program instructions in applications 612 within a memory, which is described below as a computer readable medium and which may reside within the memory device(s) 610, to perform at least some of the functionality described herein for the functional controller 112.

Figure 7:
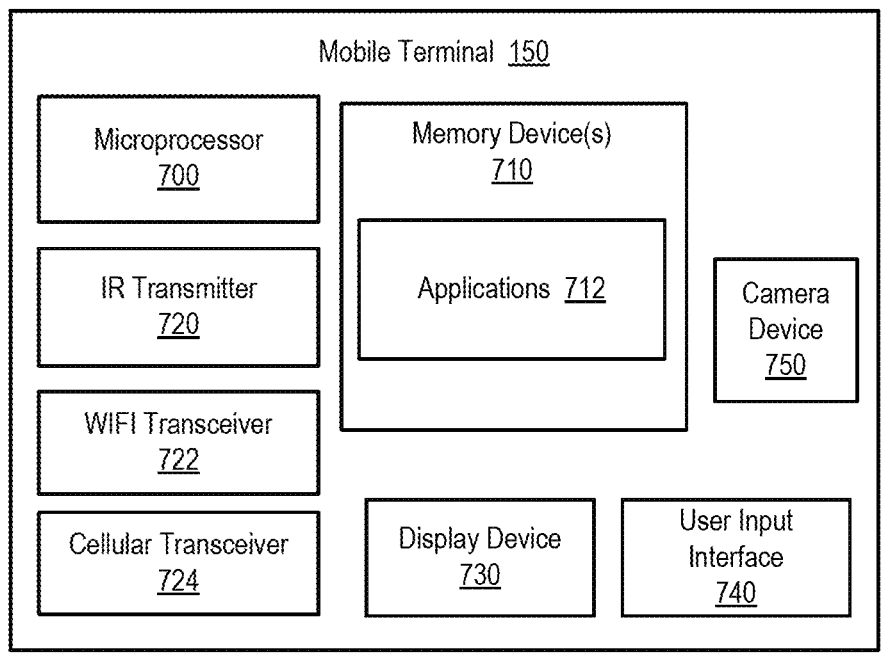
FIG. 7 illustrates the mobile terminal of FIG. 1 that is configured according to some embodiments.

Example Mobile Terminal Configuration:

FIG. 7 illustrates the mobile terminal 150 of FIG. 1 that is configured according to some embodiments. Referring to FIG. 7, the mobile terminal 150 may include a microprocessor 700, memory device(s) 710, an infrared transmitter 720, a WIFI (e.g., IEEE 802.11) transceiver 722, a cellular transceiver 724, a display device 730, a user input interface 740 (e.g., keyboard, keypad, and/or touch screen interface), and/or a camera device 750. The WIFI transceiver 722 and the cellular transceiver 724 may be configured to communicate with the video distribution equipment 110 via the radio access network 140. The cellular transceiver 724 may operate according to a cellular radio access technology that may include, but is not limited to, Global Standard for Mobile (GSM), General Packet Radio Service (GPRS), enhanced data rates for GSM evolution (EDGE), DCS, PDC, PCS, code division multiple access (CDMA), wideband-CDMA, CDMA2000, Universal Mobile Telecommunications System (UMTS), and/or 3GPP LTE ($3^{rd}$ Generation Partnership Project Long Term Evolution).

The display device 1120 may be configured to display one or more video streams, such as by the methods and operations described herein. The microprocessor 700 may include one or more data processing circuits, such as a general purpose and/or special purpose processor with on-board and/or separate memory devices. The computer/processor circuit 1110 is configured to execute computer program instructions in applications 712 within a memory, which is described below as a computer readable medium and which may reside within the memory device(s) 710, to perform at least some of the functionality described herein for the mobile terminal 150.

Further Embodiments

FIGS. 8-15 are flowcharts that illustrate operations and methods of the video distribution equipment of FIG. 1 according to some embodiments.

Figure 8:
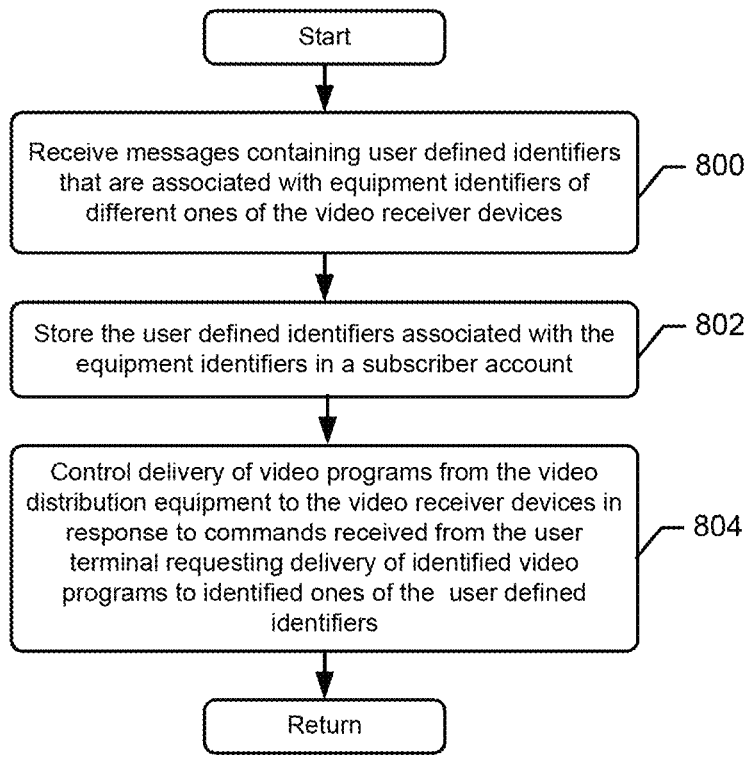
FIGS. 8-15 are flowcharts that illustrate operations and methods of the video distribution equipment of FIG. 1 according to some embodiments.

Referring to FIG. 8, operations and methods are disclosed for controlling the delivery of video programs from the video distribution equipment 110 to video receiver devices, such as the set-top boxes 120. Messages are received (block 800) at the video distribution equipment 110 from a mobile terminal 150 operated by a user. The messages contain user defined identifiers that are associated with equipment identifiers of different ones of the video receiver devices 120. The user defined identifiers are stored (block 802) associated with the equipment identifiers in a subscriber account. Delivery of video programs from the video distribution equipment 110 to the video receiver devices 120 is controlled (block 804) in response to commands received from the mobile terminal 150 requesting delivery of identified video programs to identified ones of the user defined identifiers 120.

Figure 9:
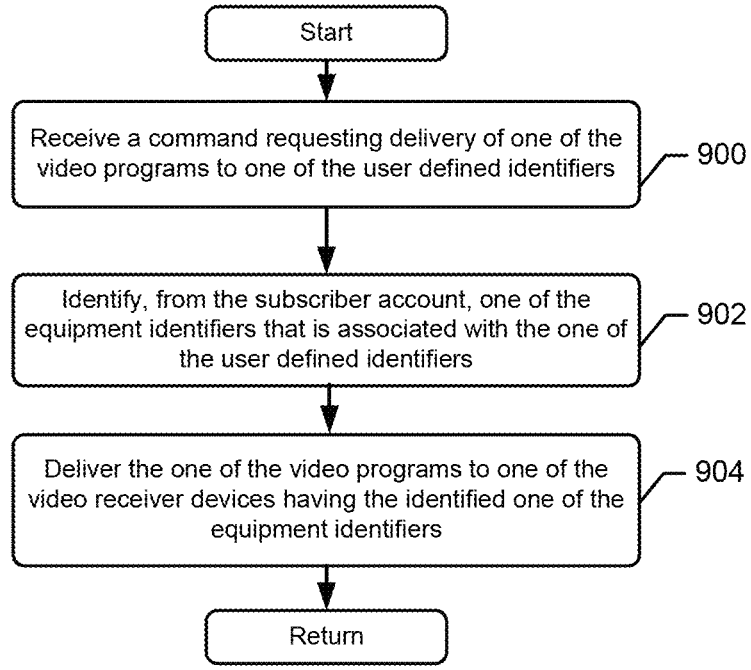

Referring to FIG. 9, the control of delivery of video programs from the video distribution equipment to the video receiver devices may include receiving (block 900) at the video distribution equipment 110 from the mobile terminal 150 a command requesting delivery of one of the video programs to one of the user defined identifiers. One of the equipment identifiers that is associated with the one of the user defined identifiers is identified (block 902) from the subscriber account. Delivery is carried out (block 904) for the one of the video programs to one of the video receiver devices 120 having the identified one of the equipment identifiers.

Figure 10:
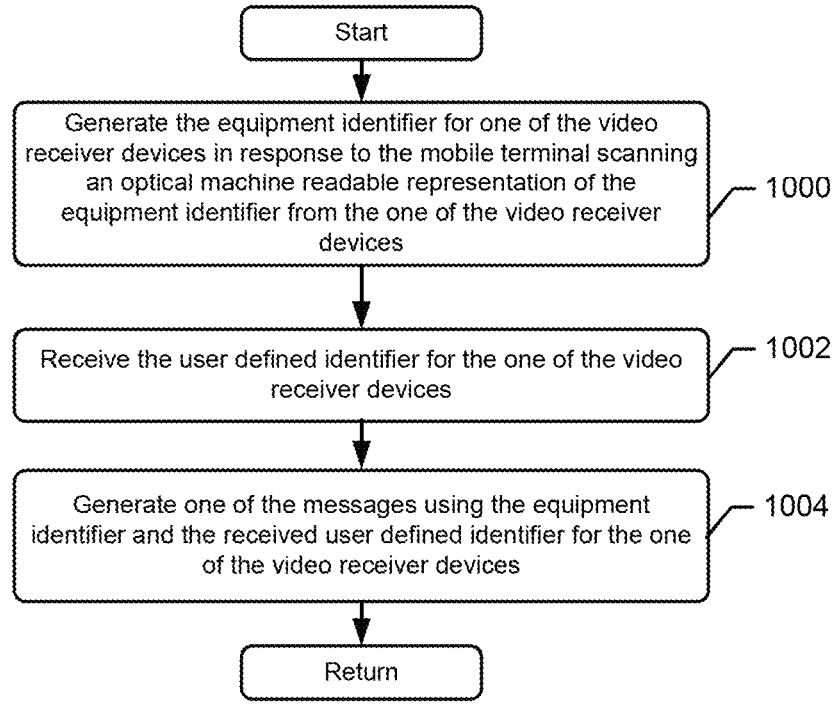

Referring to FIG. 10, the operations and methods may further include generating (block 1000) the equipment identifier for one of the video receiver devices 120 in response to the mobile terminal 150 scanning an optical machine readable representation of the equipment identifier from the one of the video receiver devices 120. The user defined identifier for the one of the video receiver devices 120 is received (block 1002). One of the messages is generated (block 1004) using the equipment identifier and the received user defined identifier for the one of the video receiver devices 120.

Figure 11:
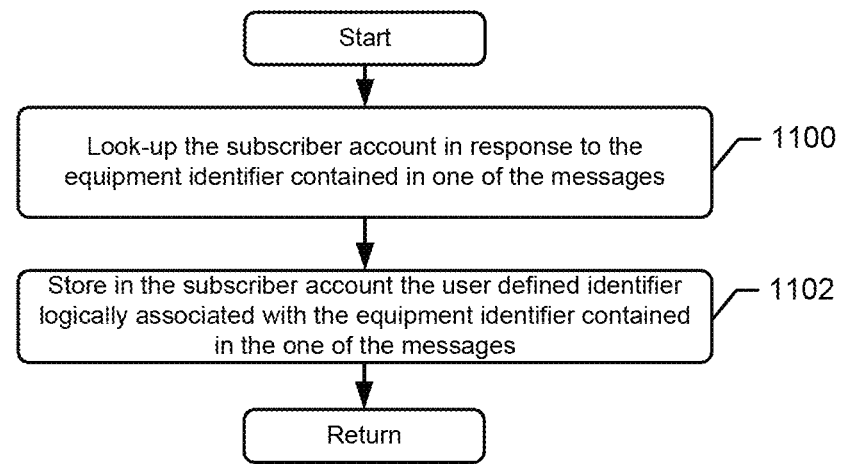

Referring to FIG. 11, storing of the user defined identifiers associated with the equipment identifiers in the subscriber account may include looking-up (block 1100) the subscriber account in response to the equipment identifier contained in one of the messages. The user defined identifier can be stored (block 1102) in the subscriber account logically associated with the equipment identifier contained in the one of the messages.

Figure 12:
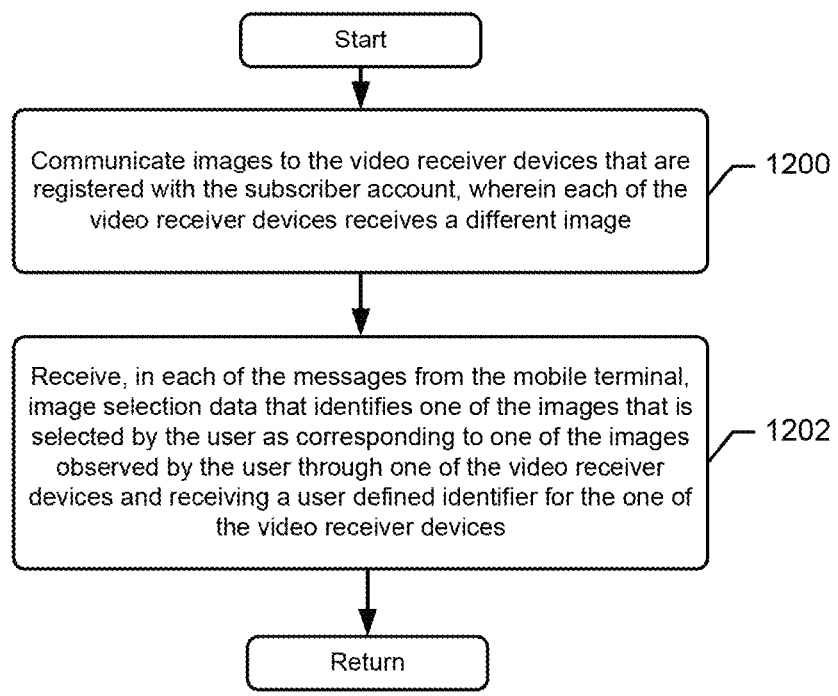

Referring to FIG. 12, images can be communicated (block 1200) to the video receiver devices 120 that are registered with the subscriber account so that each of the video receiver devices 120 receives a different image. In each of the messages from the mobile terminal 150, image selection data is received (block 1202) that identifies one of the images that is selected by the user as corresponding to one of the images observed by the user through one of the video receiver devices 120 and receiving a user defined identifier for the one of the video receiver devices 120.

Figure 13:
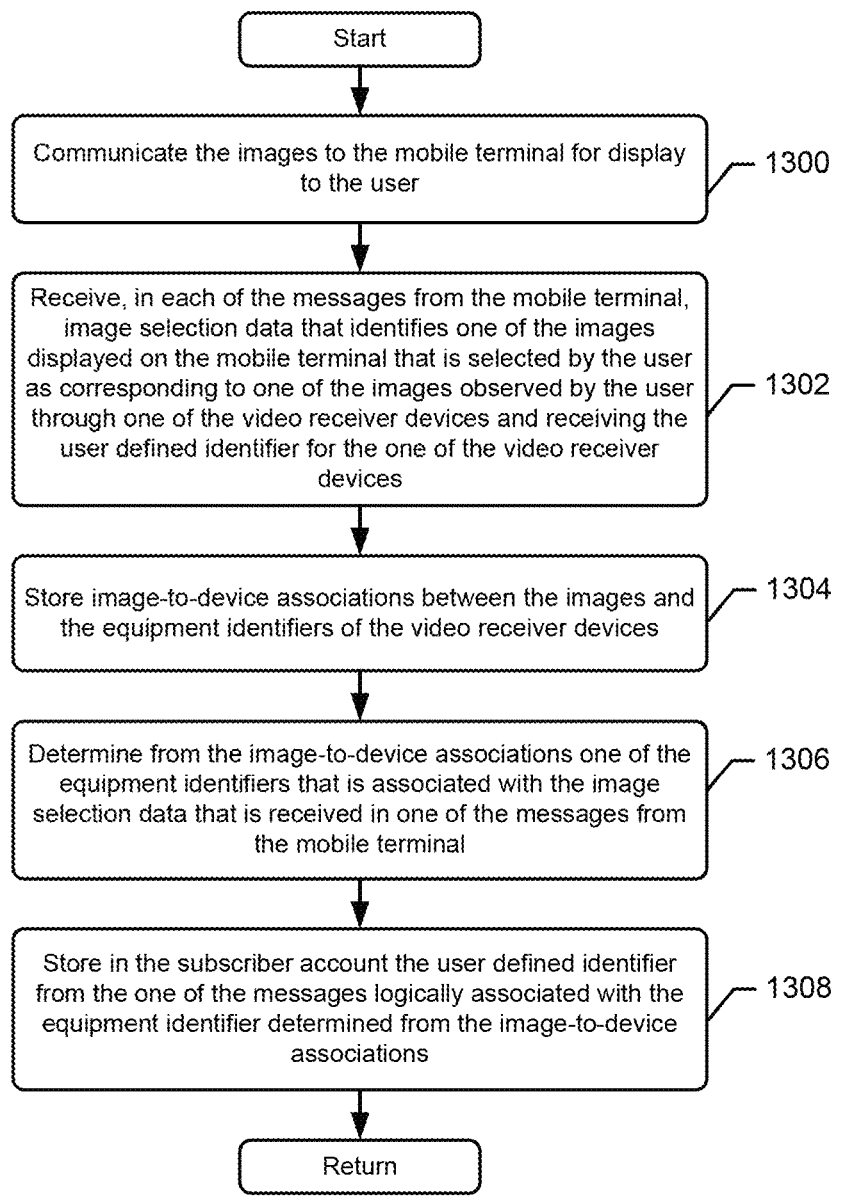

Referring to FIG. 13, the operations and methods may further include communicating (block 1300) the images to the mobile terminal 150 for display to the user. In each of the messages from the mobile terminal 150, image selection data is received (block 1302) that identifies one of the images displayed on the mobile terminal 150 that is selected by the user as corresponding to one of the images observed by the user through one of the video receiver devices 120 and receiving the user defined identifier for the one of the video receiver devices 120. Image-to-device associations between the images and the equipment identifiers of the video receiver devices 120 are stored (block 1304). The image-to-device associations are used to determine (block 1306) one of the equipment identifiers that is associated with the image selection data that is received in one of the messages from the mobile terminal 150. The user defined identifier from the one of the messages logically associated with the equipment identifier determined from the image-to-device associations is stored (block 1308) in the subscriber account.

Figure 14:
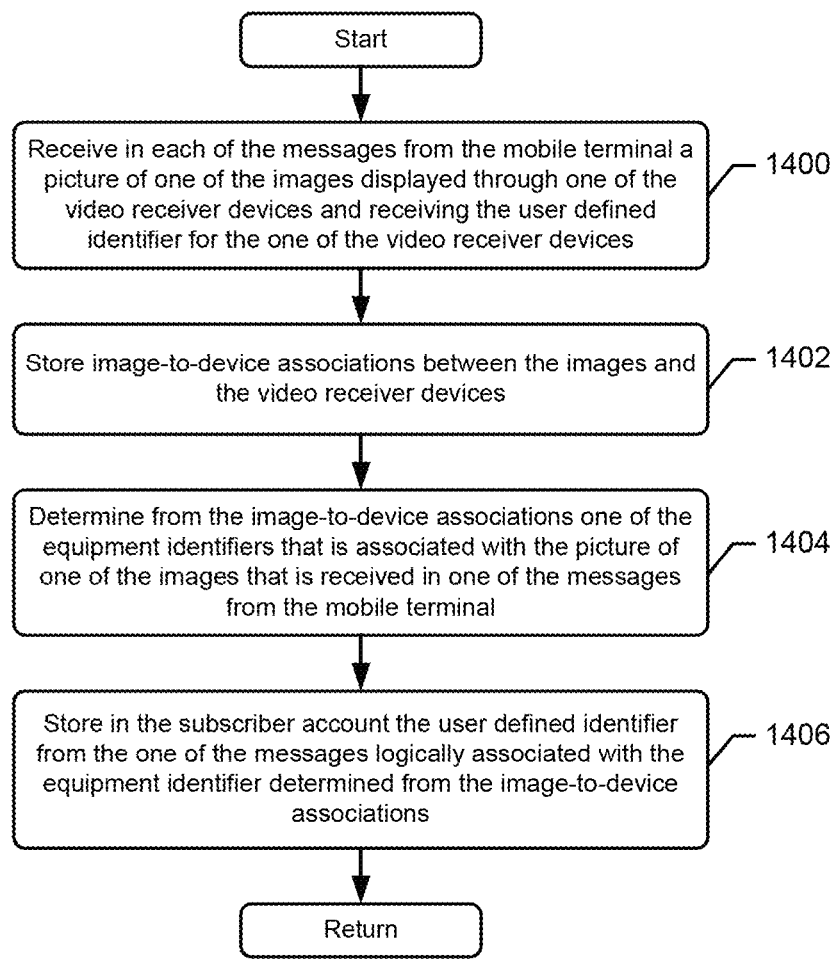

Referring to FIG. 14, the operations and methods may further include receiving (block 1400) in each of the messages from the mobile terminal 150 a picture of one of the images displayed through one of the video receiver devices 120 and receiving the user defined identifier for the one of the video receiver devices 120. The image-to-device associations between the images and the video receiver devices 120 are stored (block 1402). One of the equipment identifiers that is associated with the picture of one of the images that is received in one of the messages from the mobile terminal 150 is determined (block 1404) from the image-to-device associations. The user defined identifier from the one of the messages logically associated with the equipment identifier determined from the image-to-device associations is stored (block 1406) in the subscriber account.

Figure 15:
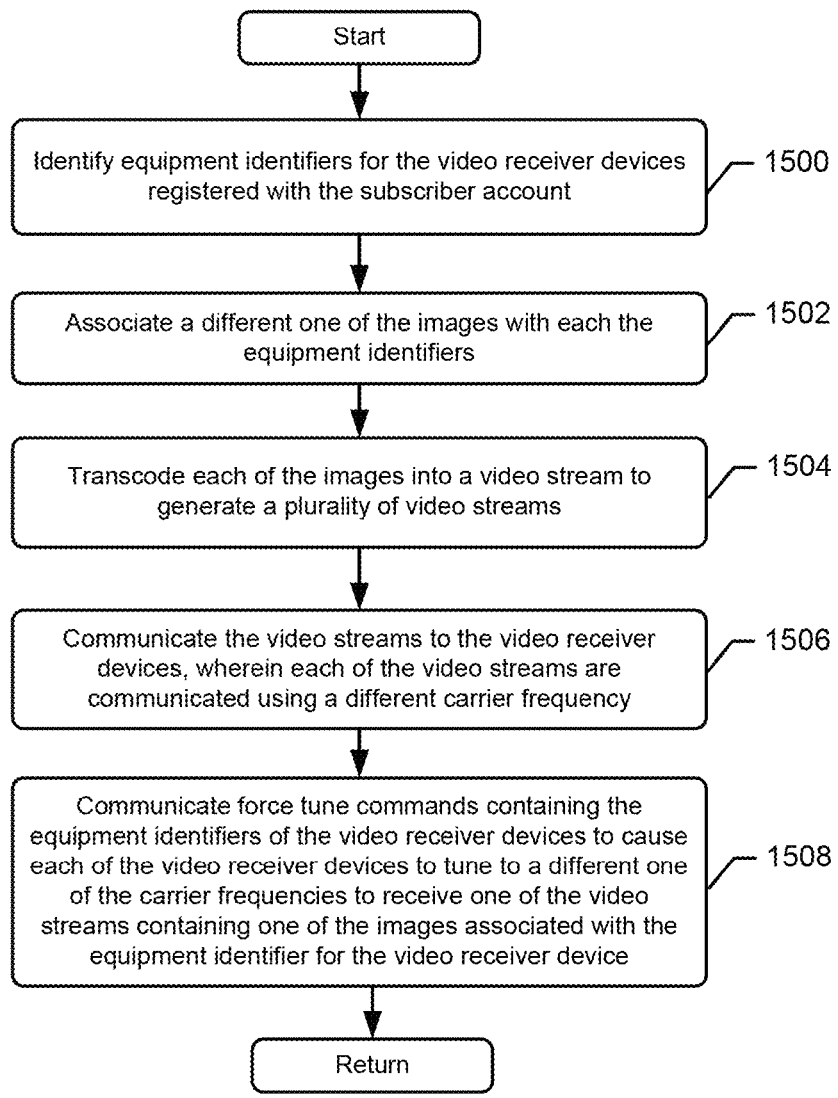

Referring to FIG. 15, communication of the images to the video receiver devices that are registered with the subscriber account may include identifying (block 1500) equipment identifiers for the video receiver devices 120 registered with the subscriber account. A different one of the images is associated (block 1502) with each the equipment identifiers. Each of the images are transcoded (block 1504) into a video stream to generate a plurality of video streams. The video streams are communicated (block 1506) to the video receiver devices 120. Each of the video streams are communicated using a different carrier frequency. Force tune commands containing the equipment identifiers of the video receiver devices 120 are communicated (block 1508) to cause each of the video receiver devices 120 to tune to a different one of the carrier frequencies to receive one of the video streams containing one of the images associated with the equipment identifier for the video receiver device 120.

Further Embodiments and Definitions

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

What is claimed is:

1. A method of controlling delivery of video programs from video distribution equipment to a video receiver device, the method comprising:
    receiving, at the video distribution equipment from a mobile terminal:
        an identifier that identifies the video receiver device and is associated with an image displayed by the video receiver device, wherein the image is communicated by the video distribution equipment to the video receiver device; and
        a user-defined identifier for the video receiver device; and
    in response to the receiving of the identifier that identifies the video receiver device and the user-defined identifier, allowing user-controlled delivery of video programs from the video distribution equipment to the video receiver device in response to a subsequent command received from the mobile terminal requesting delivery of an identified video program.

2. The method of claim 1, wherein the identifier is a picture of the image scanned by the mobile terminal.

3. The method of claim 1, wherein the user-defined identifier is a descriptive location of the video receiver device.

4. Video distribution equipment that controls delivery of video programs to a video receiver device, the video distribution equipment is configured to:
    receive, from a mobile terminal, a message comprising:
        an identifier that identifies the video receiver device and is associated with an image displayed by the video receiver device, wherein the image is communicated by the video distribution equipment to the video receiver device; and
        a user-defined identifier for the video receiver device; and
    in response to the receipt of the identifier that identifies the video receiver device and the user-defined identifier, allow user-controlled delivery of video programs from the video distribution equipment to the video receiver device in response to a subsequent command received from the mobile terminal requesting delivery of an identified video program.

5. The video distribution equipment of claim 4, wherein the identifier is a picture of the image scanned by the mobile terminal.

6. The video distribution equipment of claim 4, wherein the user-defined identifier is a descriptive location of the video receiver device.

7. A mobile terminal comprising:
a user interface that is configured to receive an identifier that identifies a video receiver device and is associated with an image displayed by the video receiver device, wherein the image was communicated by the video distribution equipment to the video receiver device;
a transceiver that is configured to communicate with video distribution equipment;
at least one microprocessor that is configured to communicate, through the transceiver, the identifier that identifies the video receiver device, and a user-defined identifier for the video receiver device to the video distribution equipment; and
the least one microprocessor is further configured to control delivery of video programs from the video distribution equipment to the video receiver device by being configured to communicate, through the transceiver, a subsequent command to the video distribution equipment, wherein the subsequent command requests delivery of an identified video program to the video receiver device.

8. The mobile terminal of claim 7, wherein the identifier is a picture of the image scanned by the mobile terminal.

9. The mobile terminal of claim 7, wherein the user-defined identifier is a descriptive location of the video receiver device.

10. A method implemented by a mobile terminal, the method comprising:
receiving, at a user interface of the mobile terminal, an identifier that identifies a video receiver device and is associated with an image displayed by the video receiver device, wherein the image was communicated by video distribution equipment to the video receiver device;
communicating the identifier that identifies the video receiver device, and a user-defined identifier for the video receiver device to the video distribution equipment; and
controlling delivery of video programs from the video distribution equipment to the video receiver device by communicating a subsequent command to the video distribution equipment, wherein the subsequent command requests delivery of an identified video program to the video receiver device.

11. The method of claim 10, wherein the identifier is a picture of the image scanned by the mobile terminal.

12. The method of claim 10, wherein the user-defined identifier is a descriptive location of the video receiver device.

13. A method of controlling delivery of video programs from video distribution equipment to one or more video receiver devices, the method implemented by the video distribution equipment comprising:
receiving, at the video distribution equipment from a mobile terminal associated with a user, one or more user-defined identifiers and one or more equipment identifiers, wherein each of the one or more user-defined identifiers are for different ones of the one or more video receiver devices, wherein each of the one or more equipment identifiers are for the different ones of the one or more video receiver devices, wherein each of the one or more user-defined identifiers are associated with a respective equipment identifier of the one or more equipment identifiers, and wherein a representation of each of the one or more equipment identifiers is printed on or otherwise displayed on a respective one of the one or more video receiver devices;
storing an association between each of the one or more user-defined identifiers and the respective equipment identifiers in a subscriber account associated with the user; and
controlling delivery of video programs from the video distribution equipment to a set of video receiver devices of the one or more video receiver devices in response to commands received from the mobile terminal requesting delivery of identified video programs to the set of video receiver devices identified by their respective user-defined identifiers.

14. A video distribution equipment that controls delivery of video programs from video distribution equipment to one or more video receiver devices, the video distribution equipment is configured to:
receive, at the video distribution equipment from a mobile terminal associated with a user, one or more user-defined identifiers and one or more equipment identifiers, wherein each of the one or more user-defined identifiers are for different ones of the one or more video receiver devices, wherein each of the one or more equipment identifiers are for the different ones of the one or more video receiver devices, wherein each of the one or more user-defined identifiers are associated with a respective equipment identifier of the one or more equipment identifiers, and wherein a representation of each of the one or more equipment identifiers is printed on or otherwise displayed on a respective one of the one or more video receiver devices;
store an association between each of the one or more user-defined identifiers and the respective equipment identifiers in a subscriber account associated with the user; and
control delivery of video programs from the video distribution equipment to a set of video receiver devices of the one or more video receiver devices in response to commands received from the mobile terminal requesting delivery of identified video programs to the set of video receiver devices identified by their respective user-defined identifiers.

15. A method of controlling delivery of video programs from video distribution equipment to video receiver devices, the method implemented by the video distribution equipment comprising:
communicating images to the video receiver devices that are registered with a subscriber account associated with a user, wherein each of the video receiver devices receives a different image;
communicating the images to a mobile terminal associated with the subscriber account for display;
receiving, from the mobile terminal, user-defined identifiers and image selection data, wherein each of the user-defined identifiers are for different ones of the video receiver devices, wherein the image selection data identifies correspondences between each of the different ones of the video receiver devices and a respective user-defined identifier of the user-defined identifiers, and wherein the image selection data identifies respective ones of the images displayed on the mobile terminal that are selected by the user as corresponding to corresponding respective ones of the images observed by the user through one of the video receiver devices;
storing an association between each of the user-defined identifiers and a respective video receiver device of the video receiver devices in the subscriber account associated with the user, wherein the association is determined based on the image selection data; and controlling delivery of video programs from the video distribution equipment to a set of video receiver devices of the video receiver devices in response to commands received from the mobile terminal requesting delivery of identified video programs to the set of video receiver devices identified by their respective user-defined identifiers.

16. A video distribution equipment that controls delivery of video programs from video distribution equipment to video receiver devices, the video distribution equipment is configured to:

communicate images to the video receiver devices that are registered with a subscriber account associated with a user, wherein each of the video receiver devices receives a different image;

communicate the images to a mobile terminal associated with the subscriber account for display;

receive, from the mobile terminal, user-defined identifiers and image selection data, wherein each of the user-defined identifiers are for different ones of the video receiver devices, wherein the image selection data identifies correspondences between each of the different ones of the video receiver devices and a respective user-defined identifier of the user-defined identifiers, and wherein the image selection data identifies respective ones of the images displayed on the mobile terminal that are selected by the user as corresponding to corresponding respective ones of the images observed by the user through one of the video receiver devices;

store an association between each of the user-defined identifiers and a respective video receiver device of the video receiver devices in the subscriber account associated with the user, wherein the association is determined based on the image selection data; and control delivery of video programs from the video distribution equipment to a set of video receiver devices of the video receiver devices in response to commands received from the mobile terminal requesting delivery of identified video programs to the set of video receiver devices identified by their respective user-defined identifiers.

* * * * *